Patented Feb. 3, 1931

1,790,990

UNITED STATES PATENT OFFICE

LEON LILIENFELD, OF VIENNA, AUSTRIA REISSUED

PROCESS FOR PREPARING VISCOSE FROM CELLULOSE

No Drawing. Application filed March 11, 1929, Serial No. 346,270, and in Austria April 10, 1928.

This invention is based on my discovery that viscose of essentially improved properties is obtained if the cellulose from which the viscose is to be made is treated once or more than once with an alkali solution containing not less than 15 per cent. by weight, and preferably not less than 18 per cent of caustic alkali (calculated as NaOH), before it is converted into the alkali cellulose which is intended for conversion into viscose. Viscose made from cellulose which has been treated in the aforesaid manner has an improved viscosity, and artificial materials, such as artificial fibres, films or the like made from the viscose are inter alia improved in respect to their strength and elasticity.

The improvements in the quality of the viscose are also attained if the cellulose is first treated in known manner with a dilute alkali solution, for example, a caustic soda solution of 5 to 8 per cent strength, and is then treated in accordance with the invention.

The aforesaid discovery is the more surprising in view of the knowledge that in the preparation of the alkali cellulose which is intended for conversion into viscose the greater part of the constituents of the cellulose other than the α-constituents (β- and γ-cellulose, hemicellulose) is removed with the liquid in the operation of pressing the alkali cellulose.

According to my present knowledge the beneficial effect of the step underlying the present invention on the preparation and properties of the viscose is due to the irreversibility of the swelling of the cellulose in the caustic alkali solution. This phenomenon is explainable by the fact that the swelling in caustic alkali solution results in a diminution of the micelles and thus in an enlargement of the surface.

The irreversibility of the swelling and the augmentation of the surface are proven by the following facts:

(1) After the caustic alkali solution has been removed by washing, the enlarged surface can be measured under the microscope, (2) the X-ray-diagram of cellulose that has been allowed to swell in strong caustic alkali solution and has been washed and even dried is different from the X-ray-diagram of the cellulose that has not been allowed to swell, (3) the absorption power and reactivity towards chemical reagents and even enzymes of cellulose that has been swollen and optionally washed and/or dried are considerably higher than the absorption power and reactivity of cellulose that has not been pretreated this way.

Now, owing to the fact that caustic alkali solution of more than 15 per cent. strength, particularly such of 18 to 30 per cent. strength (calculated as NaOH), has the highest swelling effect on cellulose, the pretreatment underlying the present process is advantageous to the subsequent cellulose xanthate reaction, since by diminishing the micelles of the cellulose and so increasing its surface it makes cellulose more reactive first of all towards the caustic alkali solution employed in the preparation of alkali cellulose and also towards the carbon disulphide in the xanthate reaction between the alkali cellulose and carbon disulphide. In other words: Whilst in the viscose art, in making the alkali cellulose, cellulose that has not been swollen in caustic alkali solution of strengths underlying the present invention is exposed to the action of caustic alkali solution, in the present process the alkali cellulose is prepared from a cellulose that has been swollen in caustic alkali solution of most favorable strengths, i. e. a cellulose that has smaller micelles and therefore a higher reactivity and absorption power.

In addition, the caustic alkali solution removes the non α-constituents of the cellulose before the latter is treated with the caustic alkali solution intended to convert it into alkali cellulose for the manufacture of viscose. And, it is a well known fact that the poorer the cellulose from which the alkali cellulose is prepared is in non α-constituents, the better the viscose with regard to its capability of being converted into artificial materials (for example its spinning capacity) and the more valuable the artificial materials produced therefrom.

In one form of the invention, cellulose (wood-cellulose, cotton, linters or cellulose of any other origin) is treated with an alkali solution containing not less than 15 to 18 per cent. (preferably 18 to 40 per cent.) of caustic alkali (calculated as NaOH), for some time (for example, from 1 to 24 hours), advantageously washed, if required, after removal of any excess of alkali solution by pressing, centrifuging or in any other suitable manner, dried if required and converted in known manner into alkali cellulose and then into viscose.

The cellulose, after treatment with the alkali solution of not less than 15 to 18 per cent. strength, may be washed with water, or more economically, having regard to the consumption of alkali, first with dilute alkali solution, say of not more than 12 per cent. strength, calculated as NaOH and then with water. The cellulose may also be washed with dilute alkali solutions of decreasing concentrations, and the washing may be conducted after the manner of counter-currents. Whilst (as pointed out in the preceding paragraph) it is advantageous to wash the cellulose after treatment with the alkali solution in accordance with the invention, the washing operation is not unconditionally necessary, and it is possible to convert the treated cellulose directly into alkali cellulose, without washing, by impregnating it again with alkali solution and pressing or centrifuging to remove the excess of alkali solution.

It is also practicable to dispense with the drying of the washed cellulose by separating from the mixture of cellulose and water resulting from the washing operation only such a quantity of water that there remains associated with the cellulose sufficient water for the operation of converting the cellulose into the alkali cellulose which is intended for conversion into viscose; the quantity of caustic alkali required for converting the cellulose into alkali cellulose is then dissolved in the water associated with the cellulose. According to the amount of water present in the cellulose, the caustic alkali may be added in the solid state or in the form of a strong solution.

The invention may be applied to dry cellulose, to cellulose which has been air-dried, or to moist or wet cellulose; in the case of moist or wet cellulose, the procedure may consist in dissolving in the water associated with the cellulose sufficient caustic alkali to produce a solution of at least 15 per cent. strength and preferably at least 18 per cent. strength (calculated as NaOH), the further operations being as already indicated.

The following examples illustrate the invention, the parts being by weight:—

*Example 1.*—100 parts of wood-cellulose (of quality usual in viscose manufacture and containing 7.5 to 9 per cent. of water) or linters (containing 6.5 to 7 per cent. of water) are stirred together with 2000 parts of caustic soda solution of 18 per cent. strength at a temperature of 15° C. until a uniform mixture is produced, this operation usually requiring about half-an-hour. The mixture is then allowed to stand at room temperature for 1 to 2 hours, at the end of which period it is introduced into a suitable filtering apparatus, such as a straining cloth or filter-press, washed with water until free from alkali and the residue pressed, comminuted or opened up, and dried at about 60° to 70° C.

The cellulose which has been thus treated is then converted by any known process into alkali cellulose and then into viscose.

*Example 2.*—The procedure is as in Example 1, with the exception that the treatment of the cellulose with caustic soda solution of 18 per cent. strength occupies 24 hours.

*Example 3.*—The procedure is as in Example 1 or 2, with the exception that before the washing operation, the mixture of cellulose and caustic soda solution is pressed until its weight amounts to 300 parts, so as to remove the excess of the caustic soda solution, whereupon the mixture is washed, advantageously after it has been loosened or comminuted.

*Example 4.*—The procedure is as in any of the preceding examples, with the exception that instead of a caustic soda solution of 18 per cent. strength there is used a solution of caustic soda of 25 to 30 per cent. strength.

*Example 5.*—The procedure is as in any of the preceding examples, with the exception that before being washed with water, the mixture of cellulose and caustic soda solution is treated with a caustic soda solution of 5 per cent. strength at room temperature, conveniently by introducing the mixture into the caustic soda solution of 5 per cent. strength or allowing the caustic soda solution to percolate through the mixture, for example, contained in a filter press. The mixture may be treated more than once with dilute caustic soda solution.

*Example 6.*—100 parts of wood-cellulose are stirred with 2000 parts of caustic soda solution of 18 per cent. strength at 15° C. until a uniform mixture is produced, this operation generally requiring about an hour. The mixture is then pressed until its weight amounts to 300 parts, and the pressed material is loosened or comminuted, and steeped in 1700 parts of caustic soda solution of 18 per cent. strength at 15° C. After the mass has been allowed to stand at room temperature for 3 hours, it is pressed until its weight amounts to 300 parts, comminuted for 3 hours, and the comminuted alkali cellulose, in matured or non-matured state, is converted into viscose according to any known process.

*Example 7.*—The procedure is as in any of Examples 1 to 5, with the exception that the treatment with caustic soda solution of 18, or 25 to 30 per cent. strength is repeated once or several times.

*Example 8.*—The procedure is as in any of Examples 1 to 5 and 7, with the exception that the washed cellulose is filtered, pressed or centrifuged in such a manner that it retains a quantity of water sufficient for the operation of converting it into the alkali cellulose which is intended for conversion into viscose (for example from 820 to 1640 parts); the required quantity of caustic alkali (for example, 180 to 360 parts of caustic soda) is dissolved in the water retained by the cellulose, the mass is pressed in the manner usual in the preparation of alkali cellulose, and the pressed material is comminuted and, if desired, after maturing in the usual manner, is treated with carbon disulphide and dissolved to produce viscose.

In the foregoing examples, instead of caustic soda, equivalent quantities of an other caustic alkali, for example caustic potash, may be employed.

I claim:

1. The process for preparing viscose from cellulose, which comprises treating the cellulose at least once with a caustic alkali solution containing not less than 15 per cent. of caustic alkali (calculated as NaOH), washing the treated cellulose, converting the washed cellulose into alkali cellulose, and converting the alkali cellulose into viscose.

2. The process for preparing viscose from cellulose, which comprises treating the cellulose at least once with a caustic alkali solution containing not less than 15 per cent. of caustic alkali (calculated as NaOH), washing the treated cellulose, drying the washed cellulose, converting the dried cellulose into alkali cellulose, and converting the alkali cellulose into viscose.

3. The process for preparing viscose from cellulose, which comprises treating the cellulose at least once with a caustic alkali solution containing not less than 15 per cent. of caustic alkali (calculated as NaOH), washing the treated cellulose first with a solution of an alkali of not more than 12 per cent. strength (calculated as NaOH) and then with water, converting the washed cellulose into alkali cellulose, and converting the alkali cellulose into viscose.

4. The process for preparing viscose from cellulose, which comprises treating the cellulose at least once with a caustic alkali solution containing not less than 15 per cent. of caustic alkali (calculated as NaOH), washing the treated cellulose, first with a solution of an alkali of not more than 12 per cent. strength (calculated as NaOH) and then with water, drying the washed cellulose, converting the washed and dried cellulose into alkali-cellulose, and converting the alkali cellulose into viscose.

5. The process for preparing viscose from cellulose, which comprises treating the cellulose at least once with a caustic alkali solution containing not less than 18 per cent. of caustic alkali (calculated as NaOH), washing the treated cellulose, converting the washed cellulose into alkali cellulose, and converting the alkali cellulose into viscose.

6. The process for preparing viscose from cellulose, which comprises treating the cellulose at least once with a caustic alkali solution containing not less than 18 per cent. of caustic alkali (calculated as NaOH), washing the treated cellulose, drying the washed cellulose, converting the washed and dried cellulose into alkali cellulose, and converting the alkali cellulose into viscose.

7. The process for preparing viscose from cellulose, which comprises treating the cellulose at least once with a caustic alkali solution containing not less than 18 per cent. of caustic alkali (calculated as NaOH), washing the treated cellulose first with a solution of an alkali of not more than 12 per cent. strength (calculated as NaOH) and then with water, converting the washed cellulose into alkali cellulose, and converting the alkali cellulose into viscose.

8. The process for preparing viscose from cellulose, which comprises treating the cellulose at least once with a caustic alkali solution containing not less than 18 per cent. of caustic alkali (calculated as NaOH), washing the treated cellulose first with a solution of an alkali of not more than 12 per cent. strength (calculated as NaOH) and then with water, drying the washed cellulose, converting the washed and dried cellulose into alkali cellulose, and converting the alkali cellulose into viscose.

In testimony whereof I affix my signature.

Dr. LEON LILIENFELD.